United States Patent
Andrusiak et al.

[19]
[11] Patent Number: 6,140,955
[45] Date of Patent: Oct. 31, 2000

[54] RULER ALGORITHM FOR PPI RECTANGULAR RADAR SCAN CONVERTER WITH STAIRCASE LINE DRAWING

[75] Inventors: Martin John Andrusiak, St. Paul; Scott Jøn Benjamin, Lakeville, both of Minn.

[73] Assignee: Lockheed Martin Corporation, Bethesda, Md.

[21] Appl. No.: 09/221,732

[22] Filed: Dec. 28, 1998

[51] Int. Cl.⁷ ........................................... G01S 7/10
[52] U.S. Cl. ............................... 342/185; 342/195
[58] Field of Search ........................... 342/185, 175, 342/176, 182, 183, 186, 195, 197

[56] References Cited

U.S. PATENT DOCUMENTS

| | | | |
|---|---|---|---|
| 3,653,044 | 3/1972 | Breeze et al. | 342/185 |
| 3,765,018 | 10/1973 | Heard et al. | 342/185 |
| 3,995,269 | 11/1976 | Schumacher | 342/174 |
| 4,214,269 | 7/1980 | Parker et al. | 348/441 |
| 4,387,365 | 6/1983 | Berry et al. | 708/442 |
| 4,547,803 | 10/1985 | Richards | 348/442 |
| 4,697,185 | 9/1987 | Thomas et al. | 342/185 |
| 4,740,789 | 4/1988 | Henri et al. | 342/185 |
| 4,745,475 | 5/1988 | Bicknell | 348/442 |
| 4,774,516 | 9/1988 | Henri et al. | 342/185 |
| 4,829,308 | 5/1989 | Tol et al. | 342/185 |
| 4,931,801 | 6/1990 | Hancock | 342/185 |
| 5,519,401 | 5/1996 | Farmer et al. | 342/185 |
| 5,530,450 | 6/1996 | Sohn et al. | 342/185 |
| 5,554,992 | 9/1996 | Toth et al. | 342/185 |

*Primary Examiner*—John B. Sotomayor
*Attorney, Agent, or Firm*—Glenn W. Bowen; Patrick M. Hogan

[57] ABSTRACT

A process provides radar scan conversion from radar amplitude data in polar coordinates to rectangular coordinates by a digital computer which receives $(r,\theta)$ coordinate amplitude data from a radar receiver and which supplies $(x,y)$ coordinate amplitude data which covers a rectangular-shaped display area of a monitor display. A software program generates an aggregate radial scan pattern that consists of a plurality of radials each of which have active lengths that span one or more of a plurality of selected regions of the display such that the region boundaries are square as a result of a modified radial drawing method. Each resolution region is defined by the bisection of the radials forming the previous resolution region and the hole-filled range of the previous resolution region. The display can be generated as an offset display where the antenna center may be offset from the display center.

28 Claims, 4 Drawing Sheets

RULER ALGORITHM FOR PPI RECTANGULAR RADAR SCAN CONVERTER WITH STAIRCASE LINE DRAWING

BACKGROUND OF THE INVENTION

1. Field of the Invention

The invention relates generally to high-speed coordinate scan conversion of radar coordinates for video presentation and more particularly to software programmed, custom hardware, or combined software and hardware video coordinate conversion.

2. Description of the Background

A scanning radar emits pulses radially from a rotating transmit/receive antenna. The returned pulses, or echoes, represent range and target amplitude information for a given angular antenna position. One common radar display presentation is the Plan Position Indicator (PPI) mode. In a centered PPI mode, the antenna position is fixed at the center of the display. It is sometimes desirable to display a region of interest which is not centered around the antenna position. This mode is denoted as offset PPI mode. The offset mode is equivalent to a movable window that is positioned around the area of interest within the overall coverage volume of the radar system.

Conventional PPI radar displays consist of circular-shaped cathode ray tubes (CRT) in which a rotating beam is made visible by electron bombardment of a phosphor coating in the CRT screen. Targets may be identified on the screen as the beam rotates in synchronism with the rotating antenna. A conventional PPI display has a number of objectionable characteristics. Because of the fact that it relies on the persistence of a phosphor, there is an inherent lack of brightness. Thus, the early tubes could be viewed satisfactorily only under very low levels of ambient lighting. Refreshing of the PPI display occurred only once per revolution of the radar antenna, and therefore was dependent on the radar revolution rate.

In order to overcome these deficiencies and to achieve other advantages, scan converters have been developed to convert the PPI information, which is a function of the radius (r) and the angle ($\theta$) of the radial beam from a reference location to TV or computer screen monitors in which the (x) and (y) coordinates of the screen are used to determine the image. Scan converter systems allow for the integration of radar displays and computer video recording techniques, including multiple color displays, overlapping windows and the capability of adding text to the display.

Numerous types of such systems have been developed for providing the conversion of $(r,\theta)$ information into the $(x,y)$ information. The majority of these relied on relatively complex hardware-dominated systems for providing the scan conversion. In the past, such complex hardware systems were required to achieve the high speed needed to process the real-time information being received from the radar return.

Software algorithms for radar coordinate digital scan conversion have been developed as shown in U.S. Pat. No. 4,697,185 entitled "Algorithm for Radar Coordinate Conversion and Digital Scan Converters," issued Sep. 29, 1987 to David M. Thomas et al., and U.S. Pat. No. 4,931,801 entitled "Method and Apparatus to Scan Convert Radar Video to Television Outputs," issued Jun. 5, 1990 to William R. Hancock. These algorithms were joined with specialized hardware to provide the desired $(r,\theta)$ to $(x,y)$ scan conversion.

In the Thomas et al. patent it was noted that near the center or origin of a PPI display, the azimuthal resolution of the radar is greater than the resolution of the display, and, therefore, a number of $(r,\theta)$ points must be matched to the same $(x,y)$ point. At long ranges in a PPI display, however, the radar resolution will often be less than that of the display. This results in a number of open areas in the display that have to be filled in. At intermediate ranges, the resolution of the radar and the display are approximately equal, and there may be a one-to-one mapping between the two coordinate systems.

As described in the Thomas et al. patent, polar radials converge near the origin where many polar coordinates map to the same cartesian coordinate, forming an "apex". Combining many polar data points to one cartesian point is referred to herein as "Apex Removal". Polar radials diverge away from the origin, such that one polar coordinate maps into many cartesian coordinates. Mapping to a single cartesian coordinate leaves "holes" in the display. Eliminating these holes is referred to herein as "Hole-Filling".

In the Thomas et al. patent, look-up tables are utilized to hold sine and cosine values to update the x and y values to the next consecutive coordinate of x and y values by adding a sine value to the x coordinate and a cosine value to the y coordinate. In the Hancock patent, look-up tables were also employed to control intensities of the display pixels. Look-up tables have also been employed in graphic displays to control colors of the image displayed.

U.S. Pat. No. 5,519,401 entitled "Programmed Radar Coordinate Conversion," issued May 21, 1996 to Michael E. Farmer et al. and assigned to the assignee of this invention was also directed to software programmed radar scan conversion. In this prior invention, radar scan conversion from $(r,\theta)$ values employed in a PPI display are converted to $(x,y)$ coordinates of a computer monitor by utilizing a digital computer which employs look-up tables, wherein the look-up tables are utilized in an algorithm which first computes an inverse mapping of the $(x,y)$ coordinates of the monitor to the $(r,\theta)$ coordinates of the PPI display to fill the look-up table with values that link together the $(x,y)$ points to the corresponding $(r,\theta)$ points.

During this mapping some of the $(r,\theta)$ points will not have been converted. To complete the mapping process a second forward mapping phase is then performed which links the remaining $(r,\theta)$ coordinates which were not mapped during the inverse mapping phase to $(x,y)$ coordinates. Each table entry represents an image patch. The number of pixels in the patch varies according to the radial distance of the patch from the origin of the display to compensate for the differences between the resolution of the radar and the resolution of the display. Since the look-up table has been established, the algorithm relates the pre-defined patches to the coordinate points of the display.

U.S. Pat. No. 5,530,450 entitled "Radar Scan Converter for PPI Rectangular and PPI Offset Rectangular Modes," issued Jun. 25, 1996 to Stephen M. Sohn et al. and assigned to the assignee of this invention was also directed to software programmed radar scan conversion. In this prior invention, a process provides radar scan conversion from radar amplitude data in polar coordinates to rectangular coordinates by a digital computer which receives $(r,\theta)$ coordinate amplitude data from a radar receiver and which supplies $(x,y)$ coordinate amplitude data to a monitor display. A software program generates an aggregate radial scan pattern that consists of a plurality of radials each of which have active lengths that span one or more zones of a plurality of selected zones of the display such that as the average azimuthal resolution associated with each zone increases, the number of generated radials matches the average azimuthal resolution of the display for each zone. The patent defined multiple circular zones wherein each zone has twice as many radials as its next innermost neighboring zone and whose radials bisect the radials comprising the next innermost zone. The circular range boundary of each zone was determined by the maximum hole-filled range of the next innermost zone as provided using traditional line drawing techniques.

U.S. Pat. No. 5,554,992 entitled "Radar Scan Converter for Producing an Aggregate Radial Scan Pattern that is a Function of Hyperbolically-based Resolution Boundaries" issued Sep. 10, 1996 to Joe M. Toth et al. and assigned to the assignee of this invention recognized the relative hyperbolic shape of the hole-filled regions resulting from the Sohn et al. radial bisection algorithm based upon traditional line drawing. This algorithm utilized hyperbolically shaped zone boundaries analogous to the circular zone boundaries of the Sohn et al. patent in order to perform hole filling and reduce redundant hits to each pixel.

The radial bisection described in the Sohn et al. patent may be described as a "Ruler Algorithm". The name is derived from the fact that the hash marks on a typical ruler become progressively shorter for smaller distance resolution, or in this case angular resolution.

SUMMARY OF THE INVENTION

Radar scan conversion from radar amplitude data in polar coordinates to rectangular coordinates is obtained in a programmable digital computer which is supplied $(r,\theta)$ coordinate amplitude data and which in turn supplies a rectangular-shaped display area of a monitor display with $(x,y)$ coordinate amplitude data. The digital computer is programmed to generate an aggregate radial scan pattern that consists of a plurality of radials each of which has active lengths that span one or more of a plurality of selected square resolution regions of said display. Each resolution region is defined by the bisection of the previous resolution region and the hole-filled range of the previous resolution region. The display can be generated in a centered mode, or the display can be generated in an offset mode in which the antenna location may be offset from the center of the display.

In the present invention zone definition is a direct result of the coupling of the ruler algorithm with a staircase line drawing algorithm. A resolution region is defined by the aggregate radial pattern and hole-filled area generated by the bisection of the radials of the previous resolution region. Bisecting radials drawn with the staircase line drawing algorithm achieve a square hole-filled area to a calculable range versus the circular zones of the Sohn et al. algorithm or the hyperbolic zones of the Toth et al. algorithm. A square hole-filled area is desirable for scan conversion to a rectangular display. The scan conversion process defined in the Sohn et al. patent redraws some pixels many times but utilizes the zones to reduce this overhead. The present invention describes several approaches to further reduce the overhead of redrawn pixels for increased algorithm efficiency.

BRIEF DESCRIPTION OF THE DRAWINGS

The invention is described by reference to the drawings in which.

DESCRIPTION OF THE PREFERRED EMBODIMENT

Figure 1:
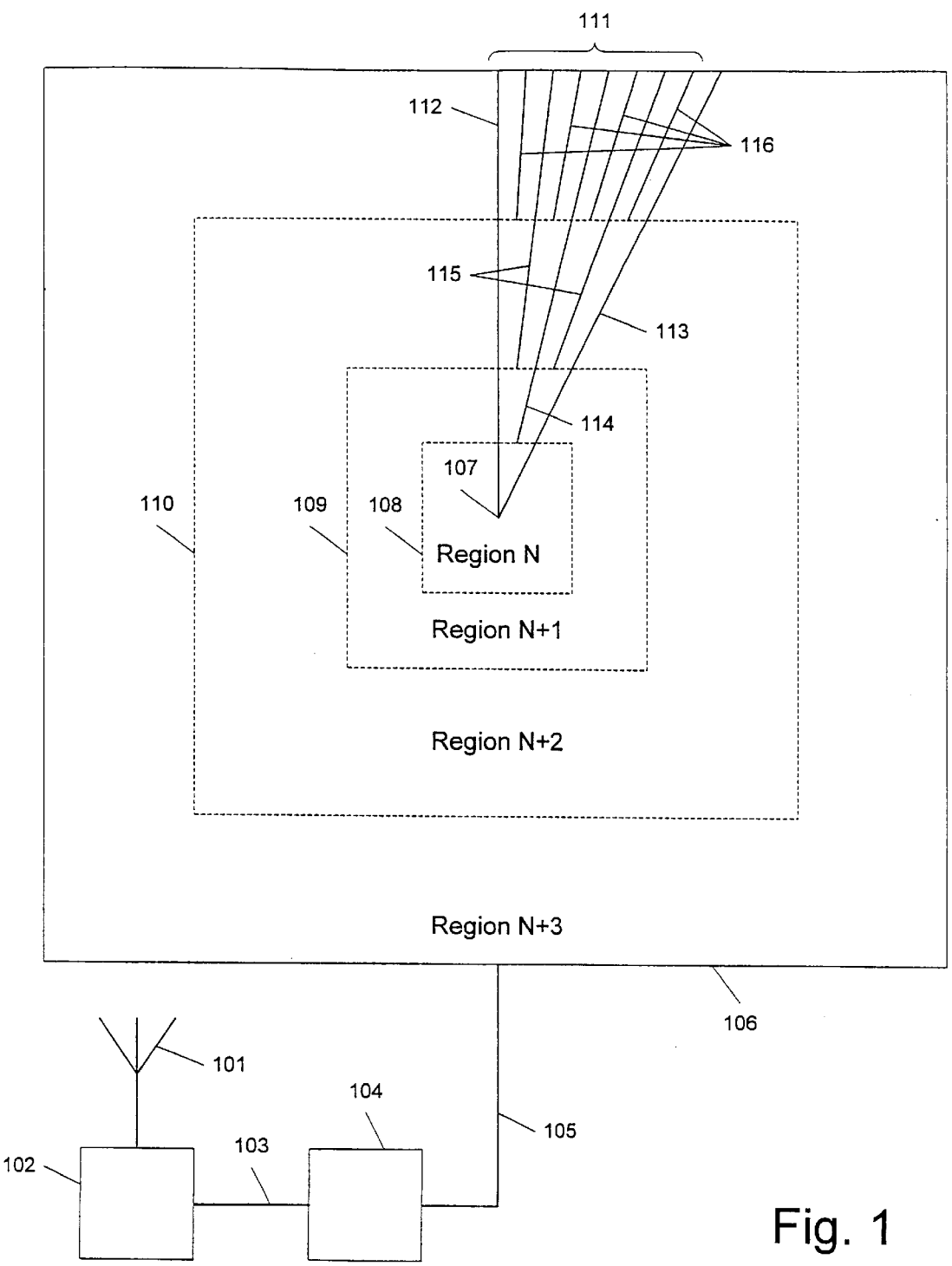
FIG. 1 is a block diagram of a system which implements the present invention, and also shows the multi-resolution scan pattern with square resolution region boundaries of the invention on a PPI radar display.

The present invention, depicted in FIG. 1, is achieved by programming a digital computer 104 which receives polar format input data (line 103) from a radar receiver 102 and supplies (line 105) rectangular coordinate amplitude data to a monitor display 106, which is typically rectangular. The pixels of contemporary graphical display devices are addressed by row and column indices. Hence, the radar data must be scan converted from the polar format of the pulse data to the rectangular format of the display pixels.

The algorithms of the present invention may be implemented in a general purpose computer processor or in a digital signal processor (DSP). They may be implemented with any type of programming, but are preferably implemented with a high level programming language for ease of programming. However, assembly and machine level programming could be employed to reduce memory requirements and increase speed, if desired. The algorithms may also be implemented with dedicated hardware or some combination of software and dedicated hardware.

A radar scan converter transforms two-dimensional radar data vectors from polar format $(r,\theta)$ to rectangular format $(x,y)$. At each angle $\theta$, as the antenna 101 steps in its rotation, the amplitude data for each range position, r, is temporarily stored in a register in a conventional manner. The computer utilizing this invention converts this $(r,\theta)$ data to data which represents the amplitude of each of a series of $(x,y)$ points of the display that are associated with the $(r,\theta)$ data.

Each radar pulse would ideally be drawn as a wedge corresponding to the azimuthal beamwidth of the radar. However, it is typical to approximate a radial line by simply converting and rounding each $(r,\theta)$ coordinate in the radar pulse to the nearest $(x,y)$ pixel coordinate. Near the origin, these radial lines will overlap, forming an "apex". A common technique for resolving the apex removal problem is to perform a read-modify-write function when updating the cartesian display memory. The modify function is normally a peak-detect or max(new, old) in order to preserve any radar target information.

As the radials lines diverge from the origin, gaps will occur at some range depending upon the azimuthal resolution and spacing of these radials. This leaves undrawn pixels on the display referred to as holes. The hole-filling problem may be resolved by re-drawing the same data as additional radials at intermediate azimuth values until all pixels are drawn at least once. This essentially extends the apex removal region farther out from the origin. The read-modify write function used to resolve the apex removal problem as described above also resolves the problem of multiple hits to the same pixel caused by drawing the additional radials to resolve the hole-filling problem.

Unfortunately, this approach results in a large number of redundant hits to many pixels and requires an excessive number of memory bus cycles which are limited by hardware performance and may limit the amount of hole-filling which may be accomplished. The prior art includes methods for the reduction of redundant hits to improve algorithm performance. The present invention reduces the number of redundant hits when compared to prior art.

The Sohn et al. patent discussed a solution to the offset PPI display problem which is also applicable to the algorithms of the present invention. The centered PPI mode may be regarded as a special case of the more general offset PPI mode in which the antenna location may be offset from the center of the display. The offset PPI mode may be divided into two scenarios depending on whether the radar origin is within or outside of the display area.

When the origin is on the display, the line drawing function always starts from the first value in the polar sample array. The size of the polar sample array is determined by the location of the origin relative to the edges of the display and the azimuth number. The location of the origin on the display is handled by changing the mapping function from the relative (x,y) coordinates to the physical (x,y) coordinates in the DrawPixel( ) function.

When the origin is off the display, the first value in the sample array must be indexed some amount from the origin. The amount of the index from the origin is determined trigonometrically by finding the range at which the first value is to be displayed. This calculation is unique to each azimuth. Additionally, the physical X/Y pixel address must be determined for the first value so the rest of the line may be drawn relative to it. It may become impractical to hole-fill gaps when the origin is offset beyond some distance because of the large number of pixels to be drawn and the relatively small amount of time between pulses with which to complete the drawing without falling behind. The preceding functions were simplified to address only the origin on the display scenario.

1. Ruler Algorithm

Azimuth (angle) may be represented in Binary Azimuth Measurement (BAMs), which is a binary fraction of 360°. For example 180° is 0.1, 90° is 0.01, 270° is 0.11 and 45° is 0.001. The number of significant digits to the right of the binary point (not decimal point!) is the BAM resolution for that BAM number. Normally the point is discarded after left shifting by the maximum BAM resolution, which is the number of bits required to represent the highest required BAM resolution. For example, a 12-bit BAM represents $2^{12}$=4096 unique angles. In 12-bit BAMs, the binary representation of 45° would be 0010,0000,0000 (or 200 hex), which has 3 significant digits, and therefore has a BAM resolution of 3.

Figure 2:
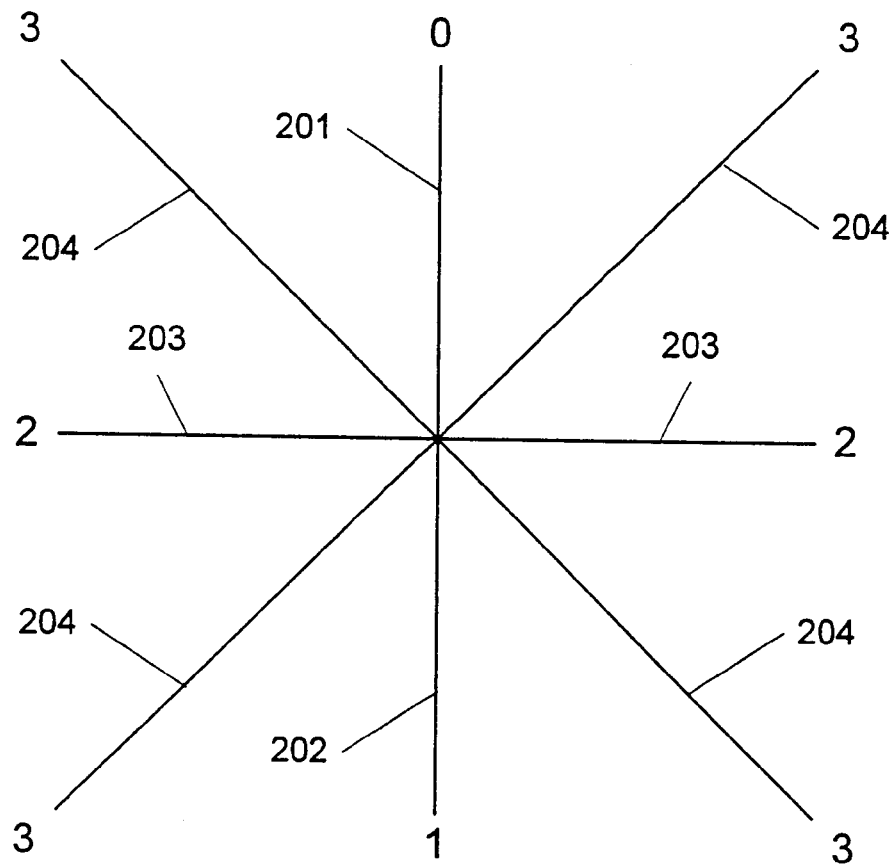
FIG. 2 is a representation of the polar ruler algorithm showing radials with BAM resolutions from 0 through 3.

The radar scan conversion algorithm of the present invention is based on a so called ruler algorithm. This algorithm considers the display to be comprised of groups of radials with distinct BAM resolutions as described above. The radials with a specific BAM resolution bisect the aggregate group of all radials with lower BAM resolutions. FIG. 2 shows a polar representation of the ruler algorithm through BAM resolution 3. The radial 201 is at BAM resolution 0. The radial 202 is at BAM resolution 1 and bisects the entire circle represented by radial 201. The radials 203 are at BAM resolution 2 and bisect radials 201 and 202. The radials 204 at BAM resolution 3 bisect the aggregate pattern of all radials at lower BAM resolutions.

When combined with the staircase line drawing technique, the aggregate pattern formed by all radials up to a specific BAM resolution produces a square hole-filled region, referred to as the resolution region corresponding to the maximum BAM resolution. The resolution region boundary determines the required starting (x,y) coordinates for drawing additional radials at the next higher BAM resolution to extend the hole-filled range produced by the aggregate radial pattern.

The following description first presents an algorithm for drawing a single radial using a known line drawing technique, for example, such as the one shown in the Sohn et al. patent. Then the staircase line drawing algorithm is presented followed by an analysis of the benefits of this line drawing algorithm when coupled with the ruler algorithm. A sequence of scan conversion algorithms is subsequently presented which utilize both line drawing algorithms with each succeeding algorithm offering improved performance over its predecessor. Each of these initial algorithms is presented with certain assumptions about the input data received from the radar. These assumptions are then analyzed and solutions are presented for the data input preprocessing issues identified. These solutions are then incorporated into the final algorithms.

2. Traditional Line Drawing Algorithm

The Sohn et al. patent described a PaintRadial( ) function that paints a series of amplitude values in a radial line relative to a specified x,y origin between minimum and maximum range boundaries at a specified azimuth. The DrawSimpleLine( ) function shown in Table I is a C programming language implementation of a PaintRadial( ) function consistent with the present invention.

The DrawSimpleLine( ) algorithm was derived with the following assumptions:

Let bam be the antenna angle using binary angle measurements counting clockwise from north where the significant bits of bam is determined by output_res.

Let the amplitude of the echo at range r be written data[r].

Let rmin (rmax) be the minimum (maximum) range to be displayed of the totality of range cells comprising the pulse.

Let sin_tab[ ] and cos_tab[ ] denote lookup tables containing the sine and cosine values corresponding to the bam number used to index into the table.

Let f2int( ) denote a function which truncates a floating point value to an integer value.

Let DrawPixel( ) denote a hardware dependent function that updates the cartesian display memory with the maximum of the new amplitude data and the current value of the pixel at the x,y coordinates. The DrawPixel( ) function also determines the physical x,y pixel addresses based upon the display coordinate system and returns a non-zero value if the pixel coordinates are outside of the physical display area.

TABLE I

DrawSimpleLine() Algorithm

```
1.  void
2.  DrawSimpleLine(int bam, int output_res, int rmin, int
    max, int *data)
3.  {
4.      float dx, dy, fx, fy;
5.      int r, x, y;
6.
8.      dx = cos_tab[bam];
9.      dy = sin_tab[bam];
10.     fx = (rmin+0.5) * dx;
```

TABLE I-continued

DrawSimpleLine() Algorithm

```
11.     fy = (rmin+0.5) * dy;
12.     for (r = rmin; r < rmax; r++) {
13.         x = f2int(fx);
14.         y = f2int(fy);
15.         if (DrawPixel(x, y, data[r]))
16.             break;
17.         fx += dx;
18.         fy += dy;
19.     }
20. }
```

Comments on function DrawSimpleLine( ):
1. Indicates the function does not return a value.
2. Defines the calling syntax of the function.
3. The function body begins here.
4. Declare floating point variables used in this function.
5. Declare integer variables used in this function.
6. Blank.
8. dx is assigned the cosine of bam.
9. dy is assigned the sine of bam.
10. x is assigned the x coordinate of the first sample.
11. y is assigned the y coordinate of the first sample.
12. A loop of instructions to compute the cartesian coordinates and plot the polar data samples from Rmin through Rmax.
13. x is assigned fx rounded to an integer.
14. y is assigned fy rounded to an integer.
15. The floating point coordinates are converted to integer for drawing a pixel on the display with amplitude from the appropriate value in the data array.
16. Break out of the loop if the pixel is outside the display area.
17. x is incremented by the value dx.
18. y is incremented by the value dy.
19. The loop ends here.
20. The function body ends here.

The values fx and fy represent the real (floating point) rectangular coordinates of each polar range cell. The values dx and dy are the change in rectangular coordinates between consecutive range cells, defining the rise and run (slope) of the radial line. The real rectangular coordinates are converted to integer display coordinates (x, y) to address the nearest display pixel. Since the sine and cosine values are between zero and one, advancing to the next range cell causes a change in both x and y that either equals 0 or 1. If the change in both x and y is 0 then the previous pixel is redrawn. If the change in only x or y is 1 then the next pixel is drawn vertically or horizontally adjacent to the previous pixel. If the change in both x and y is 1 then the next pixel is drawn diagonally adjacent to the previous pixel.

Figure 3:
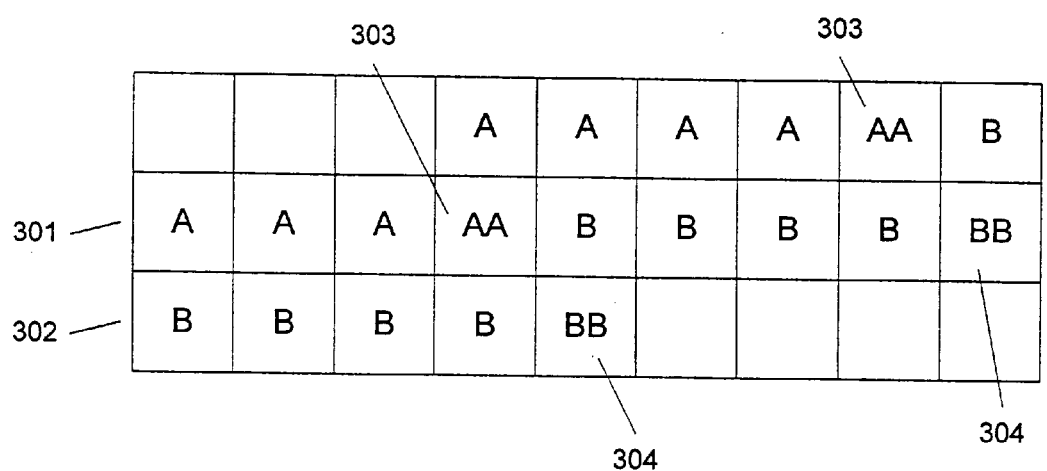
FIG. 3 is an illustration of a portion of the rectangular display after drawing two adjacent radials with the traditional line drawing algorithm, and also with the staircase line drawing algorithm.

A hole is a pixel which is not drawn by the line drawing algorithm. Holes are expected as lines diverge away from the origin but additional holes are an artifact of the traditional line drawing algorithm. These artifacts may be caused when the change in both x and y is 1 which causes a disjoint line segment. FIG. 3 shows a portion of the display representing two adjacent radials. The radar origin is assumed to be below and to the left of the represented portion of the display, with the radar rotating in a clockwise direction. The cells labeled 'A' represent the pixels drawn for radial A 301, and the cells labeled 'B' represent the pixels drawn for radial B 302. At some point, depending on the angles of radials A and B and the range of the pixels being drawn, the disjoint line segments forming radial A will leave holes in the display which are not filled by the adjacent radial B. These holes are represented by cells labeled 'AA' 303.

3. Staircase Line Drawing Algorithm

The traditional line drawing algorithm may be modified to remove the artifacts caused by drawing disjoint line segments to represent the radial line. The staircase line drawing algorithm enhances the traditional line drawing algorithm by drawing an extra pixel when the change in both x and y is 1. FIG. 3 shows the holes filled by drawing the extra pixels AA 303 and BB 304 adjacent to both the next and previous pixels when the change in both the x and y is 1. There are two candidate pixel coordinates which may be drawn to join the disjoint line segments, (new x, old y) and (old x, new y). Either candidate may be selected as long as the selection is used consistently.

The DrawStaircaseLine( ) function shown in Table II implements the improved staircase line drawing algorithm. The difference between DrawSimpleLine( ) and DrawStaircaseLine( ) is the comparison that detects a change in both x and y and draws the adjacent pixel at the new x and old y coordinate

TABLE II

DrawStaircaseLine() algorithm

```
1.  void
2.  DrawStaircaseLine(int bam, int output_res, int rmin, int
    rmax, int *data)
3.  {
4.      float theta, dx, dy, fx, fy;
5.      int r, x, old_x, y, old_y;
6.
7.      theta = ((float)bam / (1<<output_res)) * two_pi;
8,      dx = cos(theta);
9.      dy = sin(theta);
10.     fx = (rmin+0.5) * dx;
11.     fy = (rmin+0.5) * dy;
12.     old_x = f2int(fx);
13.     old_y = f2int(fy);
14.     for (r = rmin; r < rmax; r++) {
15.         x = f2int(fx);
16.         y = f2int(fy);
17.         if ((old_y != y) && (old_x != x))
18.             if (Drawpixel(x, old_y, data[r]))
19.                 break;
20.         if (Drawpixel(x, y, data[r]))
21.             break;
22.         old_x = x;
23.         old_y = y;
24.         fx += dx;
25.         fy += dy;
26.     }
27. }
```

Comments on function DrawStaircaseLine( ):
1. Indicates the function does not return a value.
2. Defines the calling syntax of the function.
3. The function body begins here.
4. Declare floating point variables used in this function.
5. Declare integer variables used in this function.
6. Blank.
7. theta is assigned the bam number converted to radians.
8. dx is assigned the cosine of theta.
9. dy is assigned the sine of theta.
10. fx is assigned the x coordinate of the sample indexed by rmin.
11. fy is assigned the y coordinate of the sample indexed by rmin.
12. old_x is initialized to the starting x coordinate converted to an integer.
13. old_y is initialized to the starting y coordinate converted to an integer.
14. A loop of instructions to compute the cartesian coordinates and plot the polar data samples from Rmin through Rmax.

15. The x coordinate is converted from floating point to integer.
16. The y coordinate is converted from floating point to integer.
17. Detects a 'stairstep' given by both x and y coordinates changing.
18. An extra pixel is plotted at coordinate (x,old_y).
19. Break out of the loop if the pixel is outside the display area.
20. The appropriate value in the data array is plotted on the display at coordinates given by (x,y).
21. Break out of the loop if the pixel is outside the display area.
22. The x coordinate is saved for the next loop iteration.
23. The y coordinate is saved for the next loop iteration.
24. fx is incremented by the value dx.
25. fy is incremented by the value dy.
26. The loop ends here.
27. The function body ends here.

The staircase line drawing algorithm has several substantial benefits when coupled with the ruler algorithm. The first is that it results in square shaped hole-filled regions which is ideal for painting radar on a square or rectangular display. With the traditional line drawing algorithm, the artifacts are closest to the origin of the polar display on the 45 degree angles and farthest from the origin at the axes. With the staircase algorithm, the fewest extra pixels are drawn close to the axis and the most are drawn at 45 degrees. The square hole-filled range for a given resolution region is given by the expression $(2^N/2\pi)$ where N is the resolution region number. This equation determines the range in x and y where the circumference of the circle in pixel units is equal to the number of radial lines (one pixel width) which results in a hole-filled display. Table 1 shows the hole-filled ranges for resolution regions 0 through 14. The Radials in Region column equals $2^{(N-1)}$. This is the number of additional radials in each resolution region. These radials bisect those drawn in the previous resolution region. The Hole-Filled X/Y Range column equals $2^N/2\pi$. All pixels with both x and y coordinates less than this value will be filled when lines are drawn using the staircase line drawing algorithm.

The second benefit of the staircase line drawing algorithm is the number of radial lines required to completely hole-fill a square display. The traditional line drawing algorithm requires $2^{14}$ (16K) radials to completely hole-fill a 1024×1024 centered PPI display (x,y range=512). This algorithm only requires $2^{12}$ (4K) radials to completely hole-fill the same 1024×1024 centered PPI display (Table 1 region 12 is 651 pixels which is greater than 512).

TABLE 1

Hole-Filled Regions

| Region N | Radials in Region | Hole-Filled X/Y Range |
|---|---|---|
| 0 | 1 | 0 |
| 1 | 1 | 0 |
| 2 | 2 | 0 |
| 3 | 4 | 1 |
| 4 | 8 | 2 |
| 5 | 16 | 5 |
| 6 | 32 | 10 |
| 7 | 64 | 20 |
| 8 | 128 | 40 |
| 9 | 256 | 81 |
| 10 | 512 | 162 |
| 11 | 1024 | 325 |
| 12 | 2048 | 651 |
| 13 | 4096 | 1303 |
| 14 | 8192 | 2607 |

The GetRegionBound( ) function shown in Table III represents an algorithm that determines, for a given BAM number, the corresponding resolution region N and hole-filled x,y boundary assuming a defined maximum resolution region (resolution). This algorithm finds the least significant non-zero bit position. The least significant bit corresponds to the highest resolution region and the most significant bit corresponds to the lowest resolution region. The algorithm returns the polar range along the radial to the hole-filled x,y range by calculating the length of the hypotenuse of the triangle where the angle and one side are known.

TABLE III

GetRegionBound() Algorithm 1. int
2. GetRegionBound(int bam, int resolution)
3. {
4.    int mask, n, bound;
5.    float theta;
6. 
7.    n = resolution;
8.    mask = 1;
9.    bam = bam + (1<<n);
10.    while ((bam & mask) == 0) {
11.      mask = (mask << 1) + 1;
12.      n--;
13.    }
14.    bound = (1 << n) / two_pi;
15.    theta = ((float)bam / (1<<resolution)) * two_pi;
16.    bound = (int) ((float)bound / max(fabs(sin(theta)), fabs (cos (theta))));
17.    return bound;
18. }

Comments on function GetRegionBound( ):
1. Indicates that the function returns an integer value.
2. Defines the calling syntax of the function.
3. The function body begins here.
4. Declare floating point variables used in this function.
5. Declare integer variables used in this function.
6. Blank.
7. n is initialized to resolution.
8. mask is initialized to 1.
9. bam is incremented by a full circle to ensure a non-zero bam value.
10. A loop of instructions that detects the right most non-zero bit in the binary representation of bam.
11. mask is left shifted with a one fill from the right.
12. n is decremented.
13. The loop ends here.
14. bound is assigned 2 raised to the power n, divided by 2 times pi.
15. theta is assigned the bam number converted to radians.
16. bound is assigned the range to the nearest resolution region boundary.
17. bound is returned to the calling expression.
18. The function ends here.
4. Scan Conversion Algorithms FIG. 1 depicts the application to radar scan conversion of the ruler algorithm and staircase line drawing resulting in square hole-filled resolution regions. The primary radial representing the current radar pulse data 112 is drawn from the radar origin 107 resulting in a square hole-filled region 108 determined by the input BAM resolution, N, of the primary radial. The primary radial is augmented to produce a wedge-shaped aggregate radial 111 by drawing hole-fill radials, 114, 115 and 116 up to the resolution required to fill all holes between the current primary radial 112 and the next primary radial 113. The fill radial 114 at the next bam resolution higher than the primary radial is drawn from the hole-filled range for the previous resolution region, N, and produces a hole-filled display from the radar origin to the boundary of resolution region N+1 109. Similarly, radials in higher resolution regions N+2 115 and N+3 116 are drawn from the hole-filled range for the previous resolution regions 109 and 110, respectively. The highest resolution region may be selected such that the hole-filled pixel range extends to the edge of the display 106 as determined by the pixel size of the display.

The fill radials may be selected to be drawn on either side of the primary radial, as long as the aggregate radial pattern represents $2^M$ consecutive BAM numbers at the highest BAM resolution, containing the primary radial BAM number, where M is the difference between the output resolution (output_res) and the input resolution (input_res) as defined below, and the selection is made consistently for all such aggregate radial wedges in the scan pattern.

The three previous functions (DrawSimpleLine( ), DrawStaircaseLine( ) and GetRegionBound( )) are combined into the following algorithms which will paint a PPI display. Each successive algorithm incorporates optimizations to improve performance. Note that the GetRegionBound( ) function may be implemented with a pre-calculated lookup table indexed by BAM number to improve execution speed. These algorithms make the following assumptions:

Display mapping and boundary checking are performed by the DrawPixel( ) function.

The radar rotates in a clockwise direction.

GetRadarPulse( ) is a hardware dependent function. This function reads the amplitude data for a pulse from the radar receiver as well as the antenna azimuth and the pulse length. The maximum BAM resolution is denoted by radar_res.

The value radar_res denotes the BAM resolution of the raw radar input.

The value input_res denotes the BAM resolution of the radar input after preprocessing as described below. This value, shown as 'N' in FIG. 1, determines the size of the wedges drawn by the hole-filling algorithms and must be less than or equal to radar_res.

The value output_res denotes the BAM resolution required to completely hole-fill the display as determined by the display size and the hole-filled range as shown in Table 1. This value, shown as 'N+3' in FIG. 1, must be greater than or equal to input_res.

The BasicScanConvert( ) function shown in Table IV implements a simple algorithm to get a radar input pulse and draw it using the staircase line drawing algorithm which provides better hole-filling than the traditional line drawing algorithm. With this process, the amount of hole-filling is determined entirely by the azimuthal resolution of the input. The major weakness of this approach is that the azimuthal resolution of the input may not be sufficient to completely hole-fill the display. For example, with a radar_res of 10 bits (1024 pulses-per-scan) and a display size of 1024×1024, the display could only be hole-filled to an X/Y range of 162 pixels from the origin which is less than the 512 pixels required to reach the edge of the display.

TABLE IV

BasicScanConvert() Algorithm

```
1.  void
2.  BasicScanConvert(int radar_res)
3.  {
4.      int bam, rmax;
5.      int data[MAX_LENGTH];
6.
7.      while (TRUE) {
8.          GetRadarPulse(&bam, radar_res, &rmax, data);
9.          DrawStaircaseLine(bam, radar_res, 0, rmax, data);
10.     }
11. }
```

Comments on function BasicScanConvert( ):

1. Indicates that the function does not return a value.
2. Defines the calling syntax of the function.
3. The function body begins here.
4. Declare integer variables used in this function.
5. Declare array to buffer radar input data.
6. Blank.
7. Loop of instructions to continuously get then draw radar input.
8. Get the next radar bam and array of return values.
9. Call DrawStaircaseLine( ) to plot the radar data at the given bam angle.
10. The loop ends here.
11. The function body ends here.

The GoodScanConvert( ) and DrawGoodWedge( ) functions shown in Table V improve upon the BasicScanConvert( ) algorithm by filling the azimuthal gaps caused by the azimuthal resolution of the input being less than required to completely hole-fill the display. Since the display is already hole-filled to the range of the input azimuthal resolution, the gaps only need to be filled by line drawing beyond the ranges already hole-filled. For an input resolution of 10 (1024 pulses-per scan) and a 1024 by 1024 display size (512 pixels from center to edge), 4096 radials are required to hole-fill the display, and each pulse is drawn with four radials. The primary radial is drawn from the origin to insure representation of all data. The hole-fill radials are only drawn beyond the hole-filled region to eliminate holes.

The GetRadarInput( ) function will be defined later in the present invention. Its function is essentially the same as GetRadarPulse( ) with the additional function of ensuring that if the radar resolution is higher than the input resolution to be used for drawing, than consecutive pulses will be integrated resulting in exactly input_res pulses-per-scan.

TABLE V

GoodScanConvert() Algorithm

```
1.  void
2.  DrawGoodWedge(int bam, int input_res, int output_res, int
    rmax, int *data)
3.  {
4.      int range, radials, i;
5.
6.      bam <<= output_res - input_res;
7.      DrawStaircaseLine(bam, output_res, 0, rmax, data);
```

TABLE V-continued

GoodScanConvert() Algorithm

```
 8.
 9.     radials = 1<<(output_res - input_res);
10.     for (i = 1; i < radials; i++) {
11.         range = GetRegionBound(bam+i, output_res);
12.         DrawStaircaseLine(bam+i, output_res, range/2, rmax,
                data);
13.     }
14. }
```

Comments on function DrawGoodWedge( ):
1. Indicates that the function does not return a value.
2. Defines the calling syntax of the function.
3. The function body begins here.
4. Declare integer variables used in this function.
5. Blank.
6. Convert the bam number from input resolution to output resolution.
7. Call DrawStaircaseLine( ) to plot the primary radial from the display center to the maximum range rmax.
8. Blank.
9. radials is assigned two raised to the power of the difference between the output and input resolutions. This is the number of radials to be drawn.
10. Loop of instructions to draw the (radials-1) additional hole-filling radials.
11. range is assigned the hole-filled range based on the resolution region of the current fill radial bam number.
12. The fill radial is drawn starting from range/2 which is already hole-filled by radials in lower resolution regions.
13. The loop ends here.
14. The function body ends here.

```
 1. void
 2. GoodScanConvert(int radar_res, int input_res, int
       output_res)
 3. {
 4.     int bam, rmax;
 5.     int data[MAX_LENGTH];
 6.
 7.     while (TRUE) {
 8.         GetRadarInput(&bam, radar_res, input_res, &rmax,
                data);
 9.         DrawGoodWedge(bam, input_res, output_res, rmax,
                data);
10.     }
11. }
```

Comments on function GoodScanConvert( ):
1–7. Same as function BasicScanConvert( ).
8. Call function GetRadarInput( ) to get the next radar input and array of return values with bam resolution defined by input resolution.
9. Call function DrawGoodWedge to draw the received radar data at the input resolution with hole-filling to the output resolution.
10–11. Same as function BasicScanConvert( )

The major weakness of the GoodScanConvert( ) function is that the DrawStaircaseLine( ) function occasionally draws extra unnecessary pixels in the previously hole-filled regions. Note that the resolution region for a given BAM number is always completely hole-filled to half the x,y range by the previous resolution region. In other words, hole-filling is unnecessary up to half of the calculated hole-filled x,y range for a given BAM.

The BetterScanConvert( ) and DrawBetterWedge( ) functions shown in Table VI eliminate this inefficiency of the GoodScanConvert( ) process by using the DrawSimpleLine( ) function up to the middle of the calculated resolution region and the DrawStaircaseLine( ) function for drawing the remainder of the radial.

TABLE VI

BetterScanConvert() Algorithm

```
 1. void
 2. DrawBetterWedge(int bam, int input_res, int output_res,
       int rmax, int *data)
 3. {
 4.     int range, radials, i;
 5.
 6.     bam <<= output_res - input_res;
 7.     range = GetRegionBound(bam, output_res);
 8.     DrawSimpleLine(bam, output_res, 0, range/2, data);
 9.     DrawStaircaseLine(bam, output_res, range/2, rmax, data);
10.
11.     radials = 1<<(output_res - input_res);
12.     for (i = 1; i < radials; i++) {
13.         range = GetRegionBound(bam+i, output_res);
14.         DrawStaircaseLine(bam+i, output_res, range/2, rmax,
                data);
15.     }
16. }
```

Comments on function DrawBetterWedge( ):
1–6. Same as function GoodScanConvert( ).
7. range is assigned the hole-filled range for the current bam number.
8. Call DrawSimpleLine( ) to draw the primary radial from the display center to the hole-filled range for the current bam number.
9. Call DrawStaircaseLine( ) to draw the rest of the primary radial out to the maximum range rmax.
10–16. Same as lines 8–14 of DrawGoodWedge.

```
 1. void
 2. BetterScanConvert(int radar_res, int input_res, int
       output_res)
 3. {
 4.     int bam, rmax;
 5.     int data[MAX_LENGTH];
 6.
 7.     while (TRUE) {
 8.         GetRadarInput(&bam, radar_res, input_res, &rmax,
                data);
 9.         DrawBetterWedge(bam, input_res, output_res, rmax,
                data);
10.     }
11. }
```

Comments on function BetterScanConvert( ):
1–8. Same as function GoodScanConvert( ).
9. Call function DrawBetterWedge to draw the received radar data at the input resolution with hole-filling to the output resolution.
10–11. Same as function GoodScanConvert( ).

The previous scan conversion algorithms rely on some unrealistic assumptions about the raw radar input data. A typical conventional rotating radar may not provide an even power-of-2 pulses-per-scan that can be mapped directly to the ruler algorithm. The BasicScanConvert( ) function previously described is capable of accepting the actual number of pulses-per-scan and painting the display. However, the display will only be hole-filled to the extent that the actual pulses-per-scan provides. An additional inefficiency may exist if the azimuthal resolution of the radar results in redrawing the same azimuth multiple times.

The following azimuth compression algorithm improves the overall performance of the radar scan conversion process by providing an even power-of-2 pulses-per-scan ($2^n$). To achieve this performance without loss of target separation, the power-of-2 resolution must be properly selected. The Optimum Lossless Azimuth Compression Ratio (OLACR) is the maximum azimuth compression factor which may be used without losing the azimuth resolution of the source as determined by the beam width. The pulses-per-scan is determined by dividing the Pulse Repetition Frequency (PRF) by the rotation rate (RPM) divided by 60 seconds/minute (PRF/(RPM/60)). The OLACR is obtained by dividing pulses-per-scan by 360 degrees multiplied by beamwidth divided by 2 to satisfy the Nyquist sampling criteria. The optimally compressed pulses-per-scan is then calculated by dividing the raw pulses-per-scan by the OLACR. This reduction in the effective pulses-per-scan will generally decrease the number of pixels drawn to completely hole-fill the display using the techniques of the present invention. Table 2 illustrates these calculations for some typical Navy shipboard radars. The ideal power-of-2 pulses-per-scan is the next larger power-of-2 above the optimally compressed pulses-per-scan.

TABLE 2

Example Radar Characteristics

| Radar Type | PRF | RPM | Raw Pulses/ Scan | Beam-width (degrees) | OLACR | Compressed Pulses/ Scan | Power of 2 pulses-per-scan |
|---|---|---|---|---|---|---|---|
| SPS-48E(1) | 1366 | 15 | 5464 | 1.5 | 11 | 497 | 512 |
| SPS-48E(2) | 161 | 15 | 644 | 1.5 | 1 | 644 | 1024 |
| SPS-67 | 750 | 16 | 2813 | 1.5 | 5 | 563 | 1024 |

In Table 2, the SPS-48E(1) supports an azimuth compression factor as high as 11 and an input resolution of $512=2^9$ (input_res=9) which can support a hole-filled display.

The GetRadarInput( ) function shown in Table VII implements an algorithm to compress consecutive overlapping radar pulse amplitude data until the BAM number converted to the input resolution changes. The maximum value of corresponding range cells from adjacent pulses is preserved in the compression process. This algorithm assumes that the radar_res is greater than or equal to the selected input_res.

TABLE VII

GetRadarInput() Algorithm

```
1.    void
2.    GetRadarInput(int *bam, int radar_res, int input_res, int *rmax, int *data)
3.    {
4.        static int old_data[MAX_LENGTH];
5.        static int old_bam = -1;
6.        int new_data[MAX_LENGTH];
7.        int new_bam, i;
8.
9.        while (TRUE) {
10.           GetRadarPulse(&new_bam, radar_res, rmax, new_data);
11.           if (radar_res > input_res)
12.               new_bam >>= radar_res - input_res;
13.           else
14.               new_bam <<= input_res - radar_res;
15.           if (old_bam == -1)
16.               old_bam = new_bam;
17.           if (new_bam != old_bam) {
18.               *bam  = old_bam;
19.               old_bam = new_bam;
20.               for (i = 0; i < *rmax; i++) {
```

TABLE VII-continued

GetRadarInput() Algorithm

```
21.                   data[i] = old_data[i];
22.                   old_data[i] = new_data[i];
23.               }
24.               return;
25.           }
26.           for (i = 0; i < *rmax; i++)
27.               old_data[i] = max(new_data[i], old_data[i]);
28.       }
29.   }
```

Comments on function GetRadarInput( ):
1. Indicates that the function does not return a value.
2. Defines the calling syntax of the function.
3. The function body begins here.
4. Declare static array to preserve radar input data between function calls. This array is assumed to be initialized to zero before program execution.
5. Declare static variable to preserve radar input bam between function calls and initialize to an invalid bam number.
6. Declare array to buffer input data from radar.
7. Declare integer variables used in this function.
8. Blank.
9. Outer loop of instructions to get and process radar data pulses.
10. Call GetRadarPulse( ) to obtain the next bam and radar return data.
11. Convert the bam number from radar resolution to input resolution.
12. When radar resolution is greater, right shift by resolution difference.
13. Else clause executed when if condition in line 11 is false.
14. When input resolution is greater, left shift by resolution difference.
15. Detect very first loop iteration.
16. On very first loop iteration initialize old_bam to new_bam.
17. Detect when bam number, converted to input resolution, changes.
18. Return old_bam number.
19. Save new bam number in static variable old_bam.
20. Inner loop of instructions to iterate through each element of data vectors.
21. Accumulated data in old_data is copied to be returned in data array.
22. new_data is saved for next function call in static old_data array.
23. The inner loop started at statement 20 ends here.
24. The function returns to the calling routine after detecting a bam change.
25. End of the list of statements executed when statement 17 evaluates true.
26. Loop to iterate through each element of the data vectors.
27. Use the old_data array to save the maximum value from corresponding range cells of the new_data and old_data arrays.
28. The outer loop started at statement 9 ends here.
29. The function body ends here.

With the GetRadarInput( ) function defined, the GoodScanConvert( ) and BetterScanConvert( ) functions are complete. The GoodScanConvert( ) function has a weakness illustrated by the radar characteristics for the SPS-48E(2) in Table 2. This radar does not support any azimuth compression and does not generate an even power-of-2 pulses-perscan which will result in gaps between radials. The following BestScanConvert( ) algorithm written in the C programming language provides gap filling for exactly one skipped BAM. By selecting the input resolution to be the next higher power-of-2 above the actual radar pulses-per-scan, an ideal radar would be able to skip at most one BAM.

The BestScanConvert( ) function shown in Table VIII implements an algorithm now optimized to handle many typical conditions. The radar resolution (radar_res) may be higher or lower than the output resolution (output_res). The input resolution (input_res) may be less than or equal to the radar resolution. The input resolution may be optimized to minimize the number of pixels drawn without loss of azimuthal resolution of the radar data. The output resolution may be selected to generate a completely hole-filled display by drawing fill radials as required based on the actual display size. The output resolution may be greater than or equal to the input resolution.

TABLE VIII

BestScanConvert() Algorithm

```
1.  void
2.  BestScanConvert(int radar_res, int input_res, int
    output_res)
3.  {
4.      int bam, old_bam_plus_2, rmax, mask;
5.      int data[MAX_LENGTH];
6.
7.      old_bam_plus_2 = -1;
8.      mask = (1<<input_res)-1;
9.      while (TRUE) {
10.         GetRadarInput(&bam, radar_res, input_res, &rmax,
                data);
11.         if (bam == old_bam_plus_2)
12.             DrawBetterWedge( (bam-1)&mask, input_res,
                    output_res, rmax, data);
13.         DrawBetterWedge(bam, input_res, output_res, rmax,
                data);
14.         old_bam_plus_2 = (bam+2) & mask;
15.     }
16. }
```

Comments on function BestScanConvert( ):
1–6. Same as function GoodScanConvert( ).
7. Initialize old_bam_plus_2 to an invalid bam number.
8. mask is assigned two raised to the power of the input resolution, minus 1.
9. Loop of instructions to continuously get then draw radar input.
10. Call function GetRadarInput( ) to get the next radar input and array of return values with bam resolution defined by input resolution.
11. If exactly 1 wedge was skipped, fill it using the current radar data.
12. Call function DrawBetterWedge( ) to fill in the skipped bam.
13. Call function DrawBetterWedge( ) to draw the received radar data at the input resolution with hole-filling to the output resolution.
14. old_bam_plus_2 is assigned bam+2, masked to the input resolution.
15. The loop ends here.
16. The function body ends here.
5. Polar Apex Removal Algorithm In order to reduce the number of redundant pixels painted even further, a polar apex removal algorithm may be implemented to complement the azimuth compression function. The polar apex removal algorithm is a pulse pre-processing algorithm that results in drawing each radial like a fill radial by starting the radial at the hole-filled range of the next lower resolution region. It performs additional azimuth compression for the samples up to the hole-filled region boundary for adjacent radials resulting in pulse data with varying start ranges. The polar apex removal algorithm benefits from the fact that the next radial drawn will hit the same pixels close to the origin as the current radial. Therefore, the overlapping pixels can be integrated and drawn once by the next radial.

This algorithm achieves its maximum efficiency (minimum pixels drawn per revolution) when all radials are visited sequentially at the selected input (wedge) resolution because each radial, including primary radials and hole-fill radials, is only drawn from the required start range as explained above. If the radials are not visited sequentially, then the polar apex removal may not be performed and the primary radials must be drawn from the radar origin, achieving an efficiency similar to the GoodScanConvert( ) algorithm.

Figure 4:
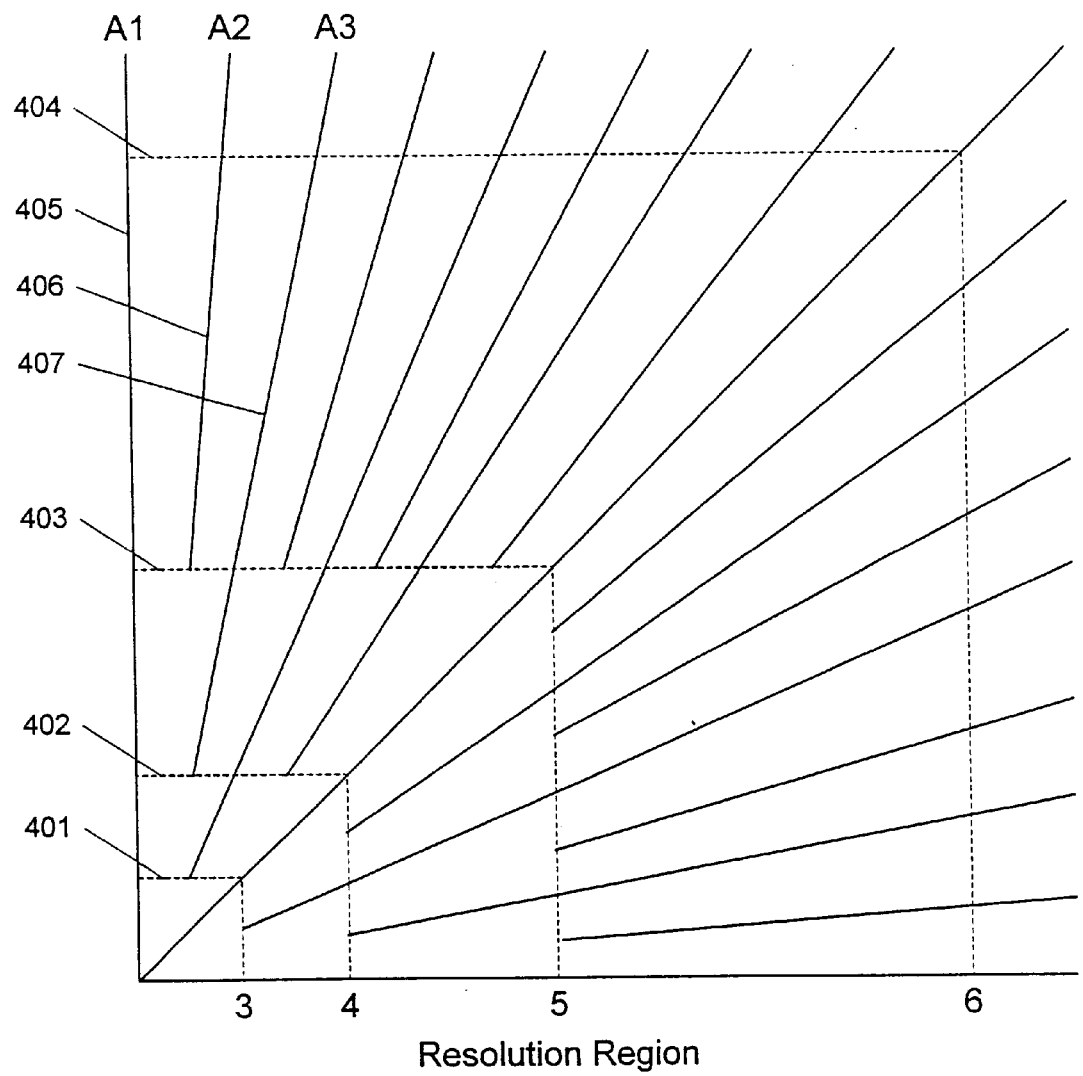
FIG. 4 is a representation of one quadrant of the PPI display showing hole-filled regions and radials up to resolution region 6, used to illustrate the processing required to implement the polar apex removal algorithm.

The apex removal algorithm uses a function which preprocesses the input radar data to perform polar apex removal by compressing corresponding range cells of adjacent pulses for a rotating radar. Polar apex removal is accomplished by using the hole-filled range corresponding to the BAM resolution of each radial to vary the starting index for azimuth compression. FIG. 4 graphically depicts the apex removal algorithm using square resolution regions. The dashed lines 401, 402, 403 and 404 represent the hole-filled ranges or resolution region boundaries for resolution regions 3 through 6, respectively (resolution regions 0 through 2 have a hole-filled range of zero). The radials extending from these region boundaries represent the radials in one quadrant up to a BAM resolution of 6, and are drawn from the hole-filled range of the previous resolution region. The polar apex removal algorithm operates as follows, assuming a clockwise radar rotation:

1) For azimuth A1 405 with BAM resolution 0, all polar samples are passed to the drawing function unmodified and the compression history is empty.

2) For azimuth A2 406 with BAM resolution 6, all polar samples up to the boundary of resolution region 5 are and preserved in the compression history. Samples beyond the boundary of resolution region 5 are passed to the drawing function unmodified.

3) For azimuth A3 407 with BAM resolution 5, all polar samples up to the boundary of resolution region 4 are peak-picked with the compression history and preserved. Samples between the boundaries of resolution region 4 and 5 are peak-picked with the compression history and the result passed to the drawing function. Samples beyond the boundary of region 5 are passed to the drawing function unmodified.

The GetApexInput( ) function shown in Table IX implements the polar apex removal preprocessing function described above. The GetRadarInput( ) function described previously is used to fetch the next radar input pulse and azimuth compress the input to the input_res resolution to match the desired wedge drawing width. Note that this function buffers an extra radar pulse in order to perform polar apex removal with the new radar pulse data. Therefore, on the very first call to GetApexInput( ) an extra call to GetRadarInput( ) is performed to initialize the old_data[ ] array, old_bam and old_range. The old_range value represents the minimum valid range in the compression history array.

TABLE IX

GetApexInput() Algorithm

```
1.   void
2.   GetApexInput(int *bam, int radar_res, int input_res, int
     *rmin, int *rmax, int *data)
3.   {
4.       static int old_data[MAX_LENGTH];
5.       static int old_bam = -1;
6.       static int old_range = 0;
7.       int new_data[MAX_LENGTH];
8.       int new_range, new_bam, i, old_bam_plus_1;
9.
10.      if (old_bam == -1) {
11.          GetRadarInput(&old_bam,radar_res,input_res,rmax,old_data
     );
12.          old_range = 0;
13.      }
14.      GetRadarInput(bam, radar_res, input_res, rmax,
     new_data);
15.      new_range = GetRegionBound(new_bam, input_res) / 2;
16.      old_bam_plus_1 = (old_bam+1) & ((1<<input_res)-1);
17.      if (new_bam != old_bam_plus_1)
18.          old_range = 0;
19.      for (i = 0; i < old_range; i++)
20.          old_data[i] = max(old_data[i], new_data[i]);
21.      for (; i < *rmax; i++) {
22.          data[i] = old_data[i];
23.          old_data[i] = new data[i];
24.      }
25.      *bam = old_bam;
26.      old_bam = new_bam;
27.      *rmin = old_range;
28.      old_range = new_range;
29.  }
```

Comments on function GetApexInput( ):
1. Indicates that the function does not return a value.
2. Defines the calling syntax of the function.
3. The function body begins here.
4. Declare static array to preserve radar input data between function calls. This array is assumed to be initialized to zero before program execution.
5. Declare static variable to preserve radar input bam between function calls and initialize to an invalid bam number.
6. Declare static variable to preserve minimum range of data saved in old_data.
7. Declare array to buffer input data from radar.
8. Declare integer variable used in this function.
9. Blank.
10. Detect very first call to this function.
11. Call function GetRadarInput( ) to initialize old_bam and old_data.
12. Initialize old_range to zero to indicate the entire old_data buffer is valid.
13. End of the list of statements executed when statement 10 evaluates true.
14. Call function GetRadarInput( ) to get the next radar input and array of return values with bam resolution defined by input resolution.
15. new_range is assigned range already hole-filled by radials at lower resolution regions, which is half of the hole-filled range for the new bam number.
16. old_bam_plus_1 is assigned (bam+1), masked to the input resolution.
17. Detect non linear bam number sequence.
18. When a non linear bam sequence is detected, set old_range to zero to cause the entire old_data array to be flushed (returned).
19. Loop of instructions to sequence through array indexes from 0 to old_range-1.
20. Use the old_data array to save the maximum value from corresponding range cells of the new_data and old_data arrays.
21. Loop of instructions to sequence through remaining array indexes from old_range to the maximum radar return range rmax.
22. Return the accumulated old_data in array data[ ].
23. Use the old_data array to preserve the remaining new_data values.
24. End of loop started at line 21.
25. Return old_bam in variable bam.
26. Save new bam number in static variable old_bam.
27. Return old_range in variable rmin.
28. new_range is preserved in the static old_range variable.
29. The function body ends here.

The ApexScanConvert( ) function shown in Table X uses the DrawApexWedge( ) function to draw the radials received from the GetApexInput( ) function from the specified minimum range, rmin. This reduces the number of pixels drawn near the radar origin where there would have been many polar samples mapped to the same display pixel.

TABLE X

ApexScanConvert() Algorithm

```
1.   void
2.   DrawApexWedge(int bam, int input_res, int output_res, int
     rmin, int rmax, int *data)
3.   {
4.       int range, radials, i;
5.
6.       bam <<= output_res - input_res;
7.       DrawStaircaseLine(bam, output_res, rmin, rmax, data);
8.
9.       radials = 1<<(output_res - input_res);
10.      for (i = 1; i < radials; i++) {
11.          range = GetRegionBound(bam+i, output_res);
12.          DrawStaircaseLine(bam+i, output_res, range/2, rmax,
             data);
13.      }
14.  }
```

Comments on function DrawApexWedge( ):
1–6. Same as function DrawGoodWedge( ).
7. Call DrawStaircaseLine( ) to draw the primary radial from range rmin.
8–14. Same as function DrawGoodWedge( ).

```
1.   void
2.   ApexScanConvert(int radar_res, int input_res, int
     output_res)
3.   {
4.       int bam, old_bam_plus_2, rmin, rmax, rmask;
5.       int data[MAX_LENGTH];
6.
7.       old_bam_plus_2 = -1;
8.       mask = (1<<input_res) -1;
9.       while (TRUE) {
10.          GetApexInput(&bam, radar_res, input_res, &rmin,
             &rmax, data);
11.          if (bam == old bam_plus_2)
12.              DrawApexWedge ((bam-
                 1) &mask,input_res,output_res,rmin,rmax,data);
13.          DrawApexWedge(bam, input_res, output_res, rmin,
             rmax, data);
14.          old_bam_plus_2 = (bam+2) & mask;
15.      }
16.  }
```

Comments on function ApexScanConvert( ):
1–9. Same as function BestScanConvert( ).
10. Call function GetApexInput( ) to get the next radar input and array of return values with bam resolution defined by input resolution.

11. If exactly 1 wedge was skipped, fill it using the current radar data.
12. Call function DrawApexWedge( ) to fill in the skipped bam.
13. Call function DrawApexWedge( ) to draw the received radar data at the input resolution starting at rmin, with hole-filling to the output resolution.
14. old_bam_plus_2 is assigned bam+2, masked to the input resolution.
15. The loop ends here.
16. The function body ends here.

6. Scan Conversion Algorithm Performance

Table 3 below compares the performance of prior art and present invention scan conversion algorithms in terms of number of pixels drawn and hole filling, assuming a centered PPI, 1024×1024 pixel display. Note that this display size requires an output resolution of 12 bits (4096 radials) to completely hole-fill the display using the staircase line drawing technique, as compared with 14 bits (16K radials) using prior art algorithms with traditional line drawing techniques.

TABLE 3

Hole-Filling Performance

| Scan Conversion Algorithm | Radar_Res (bits - radials) | Input_Res (bits - radials) | Output_Res (bits - radials) | Pixels Drawn (millions) | Hole-filled Display |
|---|---|---|---|---|---|
| Sohn et al. | 11 - 2K | 11 - 2K | 14 - 16K | 3.20 | Yes |
| BasicScanConvert | 10 - 1K | | | 0.78 | No |
| | 11 - 2K | N/A | = | 1.57 | No |
| | 12 - 4K | | Radar_Res | 3.13 | Yes |
| GoodScanConvert | | 10 - 1K | 12 - 4K | 1.89 | Yes |
| | >= | 11 - 2K | 12 - 4K | 2.14 | Yes |
| | Input_Res | 12 - 4K | 12 - 4K | 3.13 | Yes |
| BetterScanConvert | | 10 - 1K | 12 - 4K | 1.87 | Yes |
| | >= | 11 - 2K | 12 - 4K | 2.06 | Yes |
| | Input_Res | 12 - 4K | 12 - 4K | 2.80 | Yes |
| BestScanConvert | | 10 - 1K | 12 - 4K | 1.87 | Yes |
| | >= | 11 - 2K | 12 - 4K | 2.06 | Yes |
| | Input_Res-1 | 12 - 4K | 12 - 4K | 2.80 | Yes |
| ApexScanConvert (no gap filling) | | 10 - 1K | 12 - 4K | 1.81 | Yes |
| | >= | 11 - 2K | 12 - 4K | 1.81 | Yes |
| | Input_Res | 12 - 4K | 12 - 4K | 1.81 | Yes |
| ApexScanConvert (with gap filling) | | 10 - 1K | 12 - 4K | 1.81 to 1.89 | Yes |
| | >= | 11 - 2K | 12 - 4K | 1.81 to 2.14 | Yes |
| | Input_Res-1 | 12 - 4K | 12 - 4K | 1.81 to 3.13 | Yes |

The radar resolutions indicated in Table 3 assume that all BAM numbers are visited sequentially after conversion to the specified input resolution by the GetRadarInput( ) function, except for the BestScanConvert( ) and ApexScanConvert( ) algorithms, which may perform gap filling of up to one skipped BAM number.

The prior art algorithm of the Sohn et al. patent, shown for reference, requires 3.20 million pixels to produce a completely hole-filled display. The BasicScanConvert( ) spoke drawing algorithm using the staircase line drawing technique requires a 12-bit radar resolution to produce a hole-filled display by drawing 3.13 million pixels. The 'Good', 'Better' and 'Best' algorithms each draw fewer pixels when the input resolution is reduced because fewer radials must be drawn full length from the origin to the display boundary. The BestScanConvert( ) algorithm draws the same number of pixels as the BetterScanConvert( ) algorithm, but can produce a hole-filled display when the radar resolution is less than the input resolution by gap filling as described above.

The ApexScanConvert( ) algorithm requires the same number of pixels to produce a hole-filled display regardless of the input resolution. However, the input resolution must have a lower bound determined by the radar beamwidth in order to preserve angular target resolution. Also note that if the radar resolution is less than the input resolution, requiring gap filling to produce a hole-filled display, then performance may degrade to no worse than the GoodScanConvert( ) algorithm.

We claim:

1. A process for radar scan conversion of radar data based upon polar coordinates to radar data based upon rectangular coordinates in a programmable digital computer wherein said radar data based on polar coordinates is supplied to said digital computer and comprises antenna angle ($\theta$) and echo amplitude range (r) data, and said digital computer supplies radar data based on rectangular coordinates which control (x,y) defined pixels of a viewing area on a monitor display comprising:

(a) drawing a plurality of radial lines from an origin each of which lines is associated with an azimuthal resolution region wherein said radial lines bisect the aggregate group of all radial lines associated with all lower azimuthal resolution regions; and (b) modifying the drawing of said plurality of radial lines of step (a) by filling in the pixels left unfilled when the drawing of any of said radial lines changes by one pixel in both the x and y dimensions.

2. A process as claimed in claim 1 wherein the drawing of each of said radial lines further comprises:

(a) determining the resolution region number corresponding to the azimuth number of said radial line; and (b) using the resolution region number of step (a) to determine the hole-filled x or y range produced by the aggregate radial pattern comprising all radial lines in lower resolution regions; and (c) drawing additional adjacent hole-filling radials at higher resolution regions than determined in step (a) with starting x or y range as determined in step (b).

3. A process for radar scan conversion of radar data based upon polar coordinates to radar data based upon rectangular coordinates in a programmable digital computer wherein said radar data based on polar coordinates is supplied to said digital computer and comprises antenna angle (θ) and echo amplitude range (r) data, and said digital computer supplies radar data based on rectangular coordinates which control (x,y) defined pixels of a viewing area on a monitor display comprising:

(a) drawing a plurality of radial lines from an origin each of which lines is associated with an azimuthal resolution region wherein said radial lines bisect the aggregate group of all radial lines associated with all lower azimuthal resolution regions; and (b) determining the resolution region number corresponding to the azimuth number of each of said radial lines; and (c) using the resolution region number of step (b) to determine the hole-filled x or y range produced by the aggregate radial pattern comprising all radial lines in lower resolution regions; and (d) modifying the drawing of said plurality of radial lines of step (a) starting at the x or y range determined in step (c) by filling in the pixels left unfilled when the drawing of any of said radial lines changes by one pixel in both the x and y dimensions.

4. A process as claimed in claim 1 further comprising compressing corresponding echo amplitude range data of consecutive radar pulses until a change is detected in the azimuth number reduced to a specified resolution.

5. A process as claimed in claim 1 further comprising drawing additional radial lines between consecutive radar pulses when a gap of exactly one azimuth number occurs at a specified azimuth number resolution.

6. A process as claimed in claim 1 which performs polar apex removal in order to minimize drawing of redundant display pixels further comprising:

(a) determining the resolution region number corresponding to the azimuth number of each of said radial lines; and (b) using the resolution region number of step (a) to determine the hole-filled x or y range produced by the aggregate radial pattern comprising all radial lines in lower resolution regions; and (c) compressing and saving echo amplitude range data of consecutive radar pulses up to the hole-filled x or y range determined in step (b) with corresponding previously saved echo amplitude range data; and (d) modifying the drawing of said radial lines to start drawing from the x or y range determined in step (b).

7. A process as claimed in claim 1 further comprising offsetting the origin of the radial lines from the center of the display.

8. A software program for radar scan conversion of radar data based upon polar coordinates to radar data based upon rectangular coordinates in a programmable digital computer wherein said radar data based on polar coordinates is supplied to said digital computer and comprises antenna angle (θ) and echo amplitude range (r) data, and said digital computer supplies radar data based on rectangular coordinates which control (x,y) defined pixels of a viewing area on a monitor display wherein said digital computer responds to said software program by:

(a) drawing a plurality of radial lines from an origin each of which lines is associated with an azimuthal resolution region wherein said radial lines bisect the aggregate group of all radial lines associated with all lower azimuthal resolution regions; and (b) modifying the drawing of said plurality of radial lines of step (a) by filling in the pixels left unfilled when the drawing of any of said radial lines changes by one pixel in both the x and y dimensions.

9. A software program as claimed in claim 8 wherein the drawing of each of said radial lines further comprises:

(a) determining the resolution region number corresponding to the azimuth number of said radial line; and (b) using the resolution region number of step (a) to determine the hole-filled x or y range produced by the aggregate radial pattern comprising all radial lines in lower resolution regions; and (c) drawing additional adjacent hole-filling radials at higher resolution regions than determined in step (a) with starting x or y range as determined in step (b).

10. A software program for radar scan conversion of radar data based upon polar coordinates to radar data based upon rectangular coordinates in a programmable digital computer wherein said radar data based on polar coordinates is supplied to said digital computer and comprises antenna angle (θ) and echo amplitude range (r) data, and said digital computer supplies radar data based on rectangular coordinates which control (x,y) defined pixels of a viewing area on a monitor display wherein said digital computer responds to said software program by:

(a) drawing a plurality of radial lines from an origin each of which lines is associated with an azimuthal resolution region wherein said radial lines bisect the aggregate group of all radial lines associated with all lower azimuthal resolution regions; and (b) determining the resolution region number corresponding to the azimuth number of each of said radial lines; and (c) using the resolution region number of step (b) to determine the hole-filled x or y range produced by the aggregate radial pattern comprising all radial lines in lower resolution regions; and (d) modifying the drawing of said plurality of radial lines of step (a) starting at the x or y range determined in step (c) by filling in the pixels left unfilled when the drawing of any of said radial lines changes by one pixel in both the x and y dimensions.

11. A software program as claimed in claim 8 further comprising compressing corresponding echo amplitude range data of consecutive radar pulses until a change is detected in the azimuth number reduced to a specified resolution.

12. A software program as claimed in claim 8 further comprising drawing additional radial lines between consecutive radar pulses when a gap of exactly one azimuth number occurs at a specified azimuth number resolution.

13. A software program as claimed in claim 8 which performs polar apex removal in order to minimize drawing of redundant display pixels further comprising:

(a) determining the resolution region number corresponding to the azimuth number of each of said radial lines; and (b) using the resolution region number of step (a) to determine the hole-filled x or y range produced by the aggregate radial pattern comprising all radial lines in lower resolution regions; and (c) compressing and saving echo amplitude range data of consecutive radar pulses up to the hole-filled x or y range determined in step (b) with corresponding previously saved echo amplitude range data; and (d) modifying the drawing of said radial lines to start drawing from the x or y range determined in step (b).

14. A software program as claimed in claim 8 further comprising offsetting the origin of the radial lines from the center of the display.

15. A process for radar scan conversion of radar data based upon polar coordinates comprising echo amplitude data indexed by range and antenna angle (r,θ) to radar data based upon rectangular coordinates comprising pixel amplitude data indexed by row and column (x,y) to generate a plan position indication radar image which may be presented on a monitor display which is controlled by rectangular (x,y) coordinates comprising:

(a) defining an aggregate radial pattern consisting of radial lines with specific binary azimuth measurement (BAM) resolutions, determined by the number of significant bits in a binary representation of the radial azimuth, wherein the radial lines of a given BAM resolution bisect the aggregate pattern of all radial lines at lower BAM resolutions; and (b) drawing staircase lines to paint an aggregate radial pattern consisting of all radial lines up to a given BAM resolution and producing a hole-filled display to a calculable (x,y) range determined by the highest BAM resolution and defining a square hole-filled resolution region corresponding to the highest BAM resolution.

16. A process as in claim 15 further comprising drawing radial lines as an aggregate radial wedge by drawing additional hole-fill radial lines with higher BAM resolutions with the start range for each hole-fill radial determined by the resolution region boundary corresponding to the hole-fill radial BAM resolution minus one, up to a maximum BAM output resolution as required to fill all holes in the display.

17. A process for radar scan conversion of radar data based upon polar coordinates comprising echo amplitude data indexed by range and antenna angle (r,θ) to radar data based upon rectangular coordinates comprising pixel amplitude data indexed by row and column (x,y) to generate a plan position indication radar image which may be presented on a monitor display which is controlled by rectangular (x,y) coordinates comprising:

(a) a defining an aggregate radial pattern consisting of radial lines with specific binary azimuth measurement (BAM) resolutions, determined by the number of significant bits in a binary representation of the radial azimuth, wherein the radial lines of a given BAM resolution bisect the aggregate pattern of all radial lines at lower BAM resolutions; and (b) determining the resolution region number corresponding to the BAM of each of said radials and using this resolution region number to determine the hole-filled x or y range produced by the aggregate radial pattern comprising all radial lines in lower resolution regions; and (c) modifying the drawing of the radial lines of step (a) to use staircase line drawings starting at the x or y range determined in step (b) in order to minimize redundant hits to rectangular coordinates within the resolution region boundary defined by the current radial BAM resolution minus one.

18. A process as claimed in claim 15 further comprising pre-processing the incoming radar data by azimuthal compression of consecutive vectors of radar azimuth data such that said pre-processed vectors are reduced to a BAM input resolution where that the number of radar input radial data groups per radar antenna rotation is reduced to two raised to the power of the input resolution, thereby allowing the minimum BAM resolution for hole-fill radial lines to be one greater than the input resolution in order to produce a completely hole-filled scan pattern display.

19. A process as claimed in claim 15 further comprising pre-processing incoming radar data by azimuthal compression of consecutive vectors of radar azimuth data such that the pre-processed vectors are reduced to a BAM input resolution where the radar input radials per rotation may be less than two raised to the power of the input resolution, and filling gaps in the BAM input sequence by replicating one adjacent aggregate wedge between two radial lines, thereby allowing the minimum BAM resolution for hole-fill radials to be one greater than the input resolution in order to produce a completely hole-filled scan pattern display.

20. A process as claimed in claim 15 further comprising pre-processing incoming radar data by azimuthal compression of consecutive vectors of radar azimuth data from the origin to a variable start range such that the start range of said radar azimuth vectors is varied to effect apex removal in order to reduce redundant pixel hits by said radial lines to rectangular coordinates within a resolution region boundary defined by the current radial BAM resolution minus one.

21. A process as claimed in claim 15 further comprising offsetting the origin of the radial lines from the center of the display.

22. A software program for radar scan conversion of radar data in a programmable digital computer based upon polar coordinates comprising echo amplitude data indexed by range and antenna angle (r,θ) to radar data based upon rectangular coordinates comprising pixel amplitude data indexed by row and column (x,y) to generate a plan position indication radar image which may be presented on a monitor display which is controlled by rectangular (x,y) coordinates comprising:

(a) defining an aggregate radial pattern consisting of radial lines with specific binary azimuth measurement (BAM) resolutions, determined by the number of significant bits in a binary representation of the radial azimuth, wherein the radial lines of a given BAM resolution bisect the aggregate pattern of all radial lines at lower BAM resolutions; and (b) drawing staircase lines to paint an aggregate radial pattern consisting of all radial lines up to a given BAM resolution and producing a hole-filled display to a calculable (x,y) range determined by the highest BAM resolution and defining a square hole-filled resolution region corresponding to the highest BAM resolution.

23. A software program as claimed in claim 22 further comprising an algorithm to draw radial lines as an aggregate radial wedge by drawing additional hole-fill radial lines with higher BAM resolutions with the start range for each hole-fill radial determined by the resolution region boundary corresponding to the hole-fill radial BAM resolution minus one, up to a maximum BAM output resolution as required to fill all holes in the display.

24. A software program for radar scan conversion of radar data based upon polar coordinates comprising echo amplitude data indexed by range and antenna angle (r,θ) to radar data based upon rectangular coordinates comprising pixel amplitude data indexed by row and column (x,y) to generate a plan position indication radar image which may be presented on a monitor display which is controlled by rectangular (x,y) coordinates comprising:

(a) a defining an aggregate radial pattern consisting of radial lines with specific binary azimuth measurement (BAM) resolutions, determined by the number of significant bits in a binary representation of the radial azimuth, wherein the radial lines of a given BAM resolution bisect the aggregate pattern of all radial lines at lower BAM resolutions; and (b) a resolution region algorithm to determine the resolution region number corresponding to the BAM of each of said radials and using this resolution region number to determine the hole-filled x or y range produced by the aggregate radial pattern comprising all radial lines in lower resolution regions; and (c) a line drawing modification algorithm to modify the drawing of the radial lines of step (a) to use staircase line drawings starting at the x or y range determined in step (b) in order to minimize redundant hits to rectangular coordinates within the resolution region boundary defined by the current radial BAM resolution minus one.

25. A process as claimed in claim 22 further comprising a pre-processing algorithm to pre-process the incoming radar data by azimuthal compression of consecutive vectors of radar azimuth data such that said pre-processed vectors are reduced to a BAM input resolution where that the number of radar input radial data groups per radar antenna rotation is reduced to two raised to the power of the input resolution, thereby allowing the minimum BAM resolution for hole-fill radial lines to be one greater than the input resolution in order to produce a completely hole-filled scan pattern display.

26. A software program as claimed in claim 22 further comprising a pre-processing algorithm to pre-process incoming radar data by azimuthal compression of consecutive vectors of radar azimuth data such that the pre-processed vectors are reduced to a BAM input resolution where the radar input radials per rotation may be less than two raised to the power of the input resolution, and filling gaps in the BAM input sequence by replicating one adjacent aggregate wedge between two radial lines, thereby allowing the minimum BAM resolution for hole-fill radials to be one greater than the input resolution in order to produce a completely hole-filled scan pattern display.

27. A software program as claimed in claim 22 further comprising a pre-processing algorithm to pre-process incoming radar data by azimuthal compression of consecutive vectors of radar azimuth data from the origin to a variable start range such that the start range of said radar azimuth vectors is varied to effect apex removal in order to reduce redundant pixel hits by said radial lines to rectangular coordinates within a resolution region boundary defined by the current radial BAM resolution minus one.

28. A software program as claimed in claim 22 further comprising an offsetting algorithm for offsetting the origin of the radial lines from the center of the display.

* * * * *